US012467685B2

(12) United States Patent
Fuma et al.

(10) Patent No.: US 12,467,685 B2
(45) Date of Patent: Nov. 11, 2025

(54) DIELECTRIC DRYING METHOD AND DIELECTRIC DRYING DEVICE FOR CERAMIC FORMED BODIES, AND METHOD FOR PRODUCING CERAMIC STRUCTURES

(71) Applicant: NGK INSULATORS, LTD., Nagoya (JP)

(72) Inventors: Yoshimasa Fuma, Ichinomiya (JP); Yuichi Tajima, Nagoya (JP); Yoshimasa Kondo, Nagoya (JP); Kensuke Okumura, Chiryu (JP)

(73) Assignee: NGK INSULATORS, LTD., Nagoya (JP)

( * ) Notice: Subject to any disclaimer, the term of this patent is extended or adjusted under 35 U.S.C. 154(b) by 1154 days.

(21) Appl. No.: 17/304,884

(22) Filed: Jun. 28, 2021

(65) Prior Publication Data

US 2022/0074658 A1 Mar. 10, 2022

(30) Foreign Application Priority Data

Sep. 10, 2020 (JP) ................................ 2020-152369

(51) Int. Cl.
*F26B 3/34* (2006.01)
*B28B 11/24* (2006.01)
*F26B 25/20* (2006.01)

(52) U.S. Cl.
CPC .............. *F26B 3/34* (2013.01); *B28B 11/243* (2013.01); *F26B 25/20* (2013.01); *F26B 2210/02* (2013.01)

(58) Field of Classification Search
CPC ........ B28B 11/243; B28B 11/24; F26B 15/18; F26B 2210/02; F26B 25/20; F26B 3/34
See application file for complete search history.

(56) References Cited

U.S. PATENT DOCUMENTS 4,439,929 A 4/1984 Kitagawa et al.
5,263,263 A 11/1993 Gheorghiu et al.
(Continued)

FOREIGN PATENT DOCUMENTS

CN 1440630 A 9/2003
CN 102235803 A 11/2011
(Continued)

OTHER PUBLICATIONS

Chinese Office Action dated Feb. 8, 2023 (Application No. 202110929916.5).
(Continued)

*Primary Examiner* — Ibrahime A Abraham
*Assistant Examiner* — Adam M Eckardt
(74) *Attorney, Agent, or Firm* — BURR PATENT LAW, PLLC

(57) ABSTRACT

A dielectric drying method for ceramic formed bodies includes drying a plurality of ceramic formed bodies placed side by side in an arrangement direction Y perpendicular to a conveying direction X on an upper surface of a drying table by conveying the ceramic formed bodies between electrodes of an upper electrode and a lower electrode, and applying a high frequency between the electrodes. The upper electrode includes: a central region; and two end regions between which the central region is located, in the arrangement direction Y. The central region has a flat surface portion parallel to an upper end surface of the ceramic formed body. Each of the two end regions has an inclined portion inclined toward the lower electrode side.

17 Claims, 6 Drawing Sheets

(56) References Cited

U.S. PATENT DOCUMENTS

| | | | | |
|---|---|---|---|---|
| 6,225,612 | B1 * | 5/2001 | Enegren | F26B 3/347 219/774 |
| 9,038,284 | B2 * | 5/2015 | Feldman | D21F 11/145 34/259 |
| 10,763,814 | B2 * | 9/2020 | Brounley | H05B 6/782 |
| 2011/0227256 | A1 * | 9/2011 | Okumura | C04B 35/6263 264/414 |
| 2011/0241263 | A1 * | 10/2011 | Takagi | B28B 11/243 264/489 |
| 2015/0210601 | A1 * | 7/2015 | Makino | B28B 17/0036 264/433 |
| 2017/0151691 | A1 * | 6/2017 | Zimmermann | C04B 35/622 |
| 2022/0234964 | A1 | 7/2022 | Fuma et al. | |

FOREIGN PATENT DOCUMENTS

| | | | | |
|---|---|---|---|---|
| DE | 11 2020 005 946 | T5 | 2/2023 | |
| EP | 2366970 | A2 * | 9/2011 | B28B 11/241 |
| JP | S60-037382 | B2 | 8/1985 | |
| JP | H05-105501 | A1 | 4/1993 | |
| JP | H06-298563 | A1 | 10/1994 | |

OTHER PUBLICATIONS

German Office Action (with English translation) dated Jun. 17, 2024 (Application No. 10 2021 207 063.9).

* cited by examiner

DIELECTRIC DRYING METHOD AND DIELECTRIC DRYING DEVICE FOR CERAMIC FORMED BODIES, AND METHOD FOR PRODUCING CERAMIC STRUCTURES

FIELD OF THE INVENTION

The present invention relates to a dielectric drying method and a dielectric drying device for ceramic formed bodies, and a method for producing ceramic structures.

BACKGROUND OF THE INVENTION

Ceramic structures are used for various applications. For example, honeycomb-shaped ceramic structures having partition walls that define a plurality of cells each extending from a first end face to a second end face are widely used for catalyst supports, diesel particulate filters (DPFs), gasoline particulate filters (GPFs), and the like.

The ceramic structure is produced by forming a green body containing a ceramic raw material to obtain a ceramic formed body, and then drying and firing the ceramic formed body. As used herein, a state after extrusion molding and before drying is referred to as a ceramic formed body, and a state after firing is referred to as a ceramic structure.

Dielectric drying is generally used as a method for drying the ceramic formed body. According to the dielectric drying, the ceramic formed body can be placed between a pair of electrodes, a current can be conducted through the electrodes to subject a dipole of water in the ceramic formed body to molecular movement, and the ceramic formed body can be dried by the frictional heat. As used herein, the "dielectric drying" means high-frequency dielectric drying (a frequency of from about 1 to 100 MHz) that involves arranging an object to be dried between the pair of electrodes to perform drying, but it does not include microwave drying (a frequency of from about 300 MHz to 300 GHz) that involves emitting electromagnetic waves from an oscillator to the object to be dried to perform drying.

However, the dielectric drying is difficult to dry uniformly the ceramic formed body, causing problems of generating cracks and the like during firing, or resulting in non-uniform dimensions of the ceramic structure. Therefore, various measures have been taken for the dielectric drying.

For example, Patent Literature 1 proposes a method for drying a honeycomb formed body (ceramic formed body) using a drying table in which a certain region including a portion contacted with an opened lower end face of the honeycomb formed body is used as a perforated plate, because when the honeycomb formed body is placed on the drying table and dielectrically dried, a high moisture region is generated near upper and lower end faces.

Further, Patent Literature 2 proposes a method for drying honeycomb formed bodies (ceramic formed bodies) by dividing electrodes provided above upper end faces and below lower end faces of the honeycomb formed bodies into a plurality of electrodes at positions corresponding to the upper and lower end faces, respectively, and intermittently moving the honeycomb formed bodies for each pair of electrode units, in order to suppress variations in drying of the honeycomb formed bodies continuously conveyed by a conveyor.

Further, Patent Literature 3 proposes a method for drying a honeycomb formed body while rotating it around its longitudinal axis between a pair of electrodes, in order to dry uniformly the honeycomb formed body.

CITATION LIST

Patent Literatures

[Patent Literature 1] Japanese Patent Application Publication No. S60-37382 B

[Patent Literature 2] Japanese Patent Application Publication No. H05-105501 A

[Patent Literature 3] Japanese Patent Application Publication No. H06-298563 A

SUMMARY OF THE INVENTION

The present invention relates to a dielectric drying method for ceramic formed bodies, the method comprising drying a plurality of ceramic formed bodies placed side by side in an arrangement direction Y perpendicular to a conveying direction X on an upper surface of a drying table by conveying the ceramic formed bodies between electrodes of an upper electrode and a lower electrode, and applying a high frequency between the electrodes,

- wherein the upper electrode comprises: a central region; and two end regions between which the central region is located, in the arrangement direction Y;
- wherein the central region has a flat surface portion parallel to an upper end surface of the ceramic formed body,
- wherein each of the two end regions has an inclined portion inclined toward the lower electrode side; and
- wherein a ratio L2/L1 is from 0 to 1.07, in which L1 is a shortest distance between the central region and the ceramic formed body, and L2 is a shortest distance between each end of the two end regions and the ceramic formed body.

Further, the present invention relates to a method for producing ceramic structures, comprising the dielectric drying method for the ceramic formed bodies.

Furthermore, the present invention relates to a dielectric drying device for ceramic formed bodies, the device comprising:

- an upper electrode;
- a lower electrode; and
- a conveying unit capable of conveying a plurality of ceramic formed bodies between electrodes of the upper electrode and the lower electrode, the ceramic formed bodies being placed side by side in an arrangement direction Y perpendicular to a conveying direction X on an upper surface of a drying table,
- wherein the upper electrode comprises: a central region; and two end regions between which the central region is located, in the arrangement direction Y;
- wherein the central region has a flat surface portion parallel to an upper end surface of the ceramic formed body,
- wherein each of the two end regions has an inclined portion inclined toward the lower electrode side; and
- wherein a ratio L2/L1 is from 0 to 1.07, in which L1 is a shortest distance between the central region and the ceramic formed body, and L2 is a shortest distance between each end of the two end regions and the ceramic formed body.

DETAILED DESCRIPTION OF THE INVENTION

Figure 1:
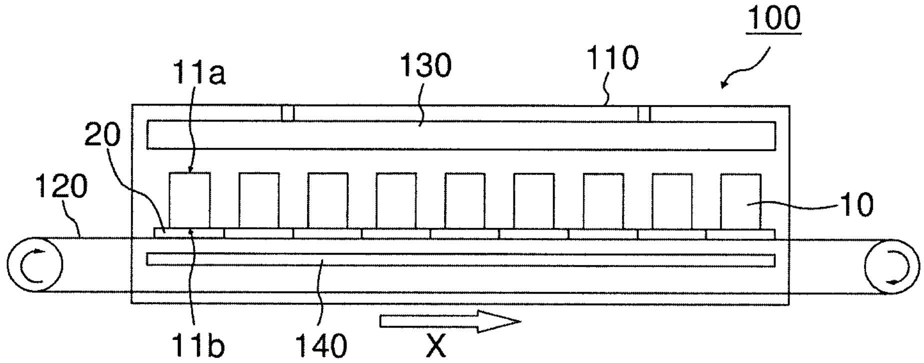
FIG. 1 is a schematic view of a dielectric drying device suitable for use in a dielectric drying method for ceramic formed bodies according to an embodiment of the present invention in a conveying direction X.

The dielectric drying of the ceramic formed body is carried out by placing a plurality of (for example, 2 to 5) ceramic formed bodies side by side in an arrangement direction Y perpendicular to a conveying direction X on an upper surface of the drying table, continuously conveying the drying table between the upper electrode and the lower electrode by a conveying unit such as a conveyor and applying a high frequency.

However, although the method described in Patent Literature 1 can suppress a variation in the dried state of the upper portion and the lower portion of the single ceramic formed body placed on the drying table, it is difficult to suppress a variation in the dried state in the arrangement direction Y (width direction of the drying table). Specifically, since the ceramic formed body placed near the central portion in the arrangement direction Y is located in an environment where an electric field strength is larger, it has a higher drying rate, so that a drying shrinkage rate tends to increase. On the other hand, since the ceramic formed body placed near the end in the arrangement direction Y is located in an environment where the electric field strength is smaller, it has a lower drying rate, so that the drying shrinkage rate tends to decrease. As a result, the dry state varies depending on different positions of the ceramic formed bodies arranged side by side in the arrangement direction Y.

Further, the method described in Patent Literature 2 is intended to suppress variations in the drying states of the ceramic formed bodies placed on a plurality of drying tables in the conveying direction X. However, it is not intended to suppress variations in the dry states of the plurality of ceramic formed bodies in the arrangement direction Y.

Further, since the method described in Patent Literature 3 is used in a batch furnace, it is difficult to apply this method to a continuous furnace premised on mass production.

The present invention has been made to solve the above problems. An object of the present invention is to provide a dielectric drying method and a dielectric drying device for ceramic formed bodies, which can suppress variations in the dried states of a plurality of ceramic formed bodies placed on the drying table, in the arrangement direction Y perpendicular to the conveying direction X.

Another object of the present invention is to provide a method for producing ceramic structures capable of making the ceramic structures having a uniform shape.

As a result of intensive studies for the dielectric drying of a plurality of ceramic formed bodies placed side by side in the arrangement direction Y perpendicular to the conveying direction X on the upper surface of the drying table, the present inventors have found that the above problems can be solved by controlling the shape of the upper electrode such that distances to the plurality of ceramic formed bodies satisfy predetermined conditions.

According to the present invention, it is possible to provide a dielectric drying method and a dielectric drying device for ceramic formed bodies, which can suppress variations in the dried states of a plurality of ceramic formed bodies placed on the drying table, in the arrangement direction Y perpendicular to the conveying direction X.

Further, according to the present invention, it is possible to provide a method for producing ceramic structures capable of making the ceramic structures having a uniform shape.

Hereinafter, embodiments according to the present invention will be specifically described. It is to understand that the present invention is not limited to the following embodiments, and various modifications and improvements, which will be within the scope of the present invention, may be made based on ordinary knowledge of a person skilled in the art, without departing from the spirit of the present invention.

(1) Dielectric Drying Method and Dielectric Drying Device for Ceramic Formed Bodies A dielectric drying method for ceramic formed bodies according to an embodiment of the present invention is carried out by drying a plurality of ceramic formed bodies placed side by side in an arrangement direction Y perpendicular to a conveying direction X on an upper surface of a drying table by conveying the ceramic formed bodies between an upper electrode and a lower electrode (between electrodes), and applying a high frequency between the electrodes.

FIG. 1 shows a schematic view of a dielectric drying device suitable for use in the dielectric drying method for the ceramic formed bodies in the conveying direction X. Further, FIG. 2 shows a schematic view of the dielectric drying device in the arrangement direction Y.

Figure 2:
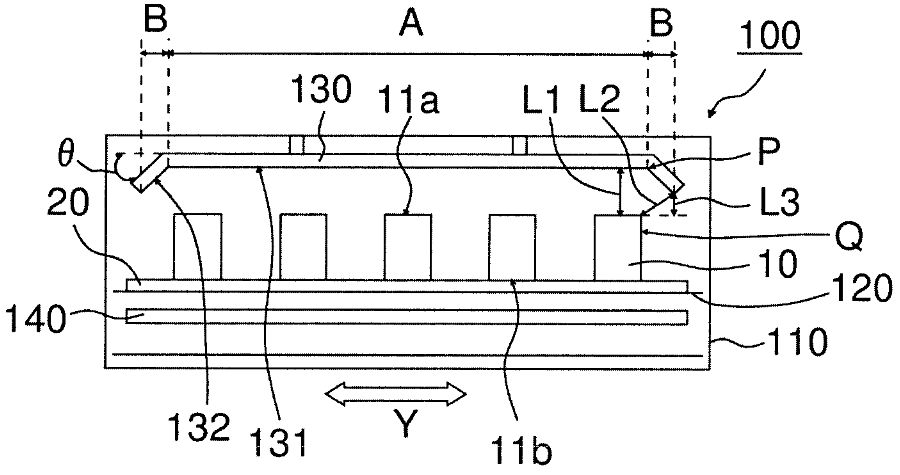
FIG. 2 is a schematic view of the dielectric drying device of FIG. 1 in an arrangement direction Y.

As shown in FIGS. 1 and 2, a dielectric drying device 100 includes: an upper electrode 130; a lower electrode 140; and a conveying unit 120 (for example, a conveyor) capable of conveying a plurality of ceramic formed bodies 10 between the electrodes of the upper electrode 130 and the lower electrode 140, the ceramic formed bodies 10 being placed side by side in the arrangement direction Y perpendicular to the conveying direction X on an upper surface of a drying table 20. The upper electrode 130 is provided above a dielectric drying furnace 110, and the lower electrode 140 is provided below the dielectric drying furnace 110. The dielectric drying device 100 having such a basic structure is known in the art. Further, the dielectric drying device 100 may further include a known structure (for example, a ventilation drying device) as long as the effect of the present invention is not impaired.

The plurality of ceramic formed bodies 10 placed on the drying table 20 are conveyed between the electrodes of the upper electrode 130 and the lower electrode 140 in the dielectric drying furnace 110 by the conveying unit 120. In this case, the dipole of water in the ceramic formed bodies 10 is subjected to molecular movement by the high frequency energy generated by passing an electric current between the upper electrode 130 and the lower electrode 140, and the ceramic formed bodies 10 can be dried by that frictional heat.

The number of the plurality of ceramic formed bodies 10 placed on the drying table 20 may be appropriately adjusted depending on the size of the drying table 20, and the like. It is preferably from 2 to 5, and more preferably 3 to 5.

The sizes of the plurality of ceramic formed bodies 10 placed on the drying table 20 are not particularly limited. It is preferable that lengths of them in the vertical direction Z are substantially the same, and it is more preferable that lengths of them in all directions are substantially the same.

Both the upper electrode 130 and the lower electrode 140A use a known electrode plate. Further, the upper electrode 130 can be processed by a known method to form it into a desired shape.

The upper electrode 130 includes: a central region A: and two end regions B between which the central region A is located, in the arrangement direction Y of the plurality of ceramic formed bodies 10.

The central region A has a flat surface portion 131 parallel to upper end surfaces 11*a* of the plurality of ceramic formed bodies 10. Further, each of the two end regions B has an inclined portion 132 inclined toward the lower electrode 140 side.

As used herein, the "inclined portion 132 inclined toward the lower electrode 140 side" means a portion having an angle inclined in a range of more than 0° and less than 180° toward the lower electrode 140 side with reference to the flat portion (an inclined angle of) 0° in the central region A.

A ratio L2/L1 is from 0 to 1.70, and preferably from 0 to 0.70, in which L is a shortest distance between the central region A of the upper electrode 130 and each of the ceramic formed bodies 10, and L2 is a shortest distance between each end of the two end regions B of the upper electrode 130 and each of the ceramic formed bodies 10.

Figure 3:
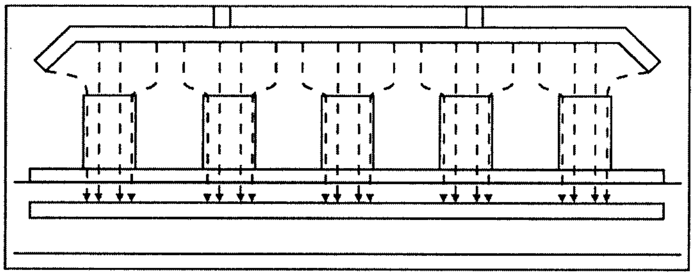
FIG. 3 is a view showing density distributions of electric lines of force in the schematic view of the dielectric drying device of FIG. 2.

By controlling the ratio L2/L1 to the above range, density distributions of the lines of electric force of the two ceramic formed bodies 10 at both ends in the arrangement direction Y will be substantially the same as those of the lines of electric force of the three ceramic formed bodies 10 at the center in the arrangement direction Y, as shown in FIG. 3. Therefore, electric field strengths of the two ceramic formed bodies 10 at both ends in the arrangement direction Y are substantially the same as those of the three ceramic formed bodies 10 at the center in the arrangement direction Y, so that variations in the dried states of the plurality of ceramic formed bodies 10 in the arrangement direction Y can be suppressed.

Figure 4:
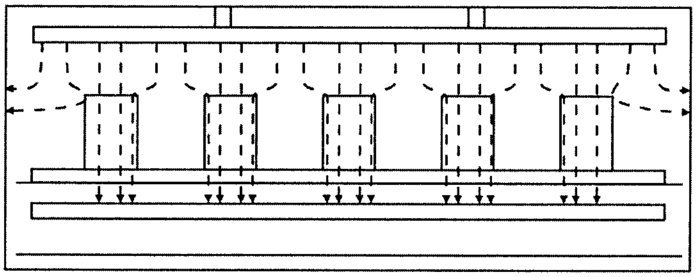
FIG. 4 is a view showing density distributions of electric lines of force when a flat plate type upper electrode is used.

However, if the ratio L2/L1 is out of the above range, the density distributions of the lines of electric force of the two ceramic formed bodies 10 at both ends in the arrangement direction Y will be smaller than those of the lines of electric force of the three ceramic formed bodies 10 at the center in the arrangement direction Y, as shown in FIG. 4. Therefore, the electric field strengths of the two ceramic formed bodies 10 at both ends in the arrangement direction Y are smaller than those of the three ceramic formed bodies 10 at the center in the arrangement direction Y, so that the dried states of the plurality of ceramic formed bodies 10 vary in the arrangement direction Y. Specifically, the two ceramic formed bodies 10 at both ends in the arrangement direction Y will be difficult to be dried as compared with the three ceramic formed bodies 10 at the center in the arrangement direction Y.

Preferably, in the upper electrode 130, an inclination starting point P of each of the two end regions B is located at the same position as an outer end Q of each of the ceramic formed bodies 10 at both ends, or is located outside the outer end Q, in the arrangement direction Y.

The controlling of the position of the starting point P as described above leads to easy control of the density distribution of the lines of electric force in the region where the two ceramic formed bodies 10 at both ends in the arrangement direction Y are located to the same degree of density distribution of the lines of electric force in the region where the three central ceramic formed bodies 10 at the center in the arrangement direction Y are located. Therefore, the effect of suppressing the variations in the dried states of the plurality of ceramic formed bodies 10 in the arrangement direction Y can be stably obtained.

Auxiliary electrodes 30 may be placed on upper end surfaces 11*a* of the plurality of ceramic formed bodies 10. The placing of the auxiliary electrodes 30 can result in uniform electric field strengths on the upper end surfaces 11*a* of the ceramic formed bodies 10 which would otherwise tend to generate non-uniform electric field strengths during dielectric drying. This can bring about a uniform heating amount of the ceramic formed bodies 10 as a whole to reduce uneven drying.

Figure 5:
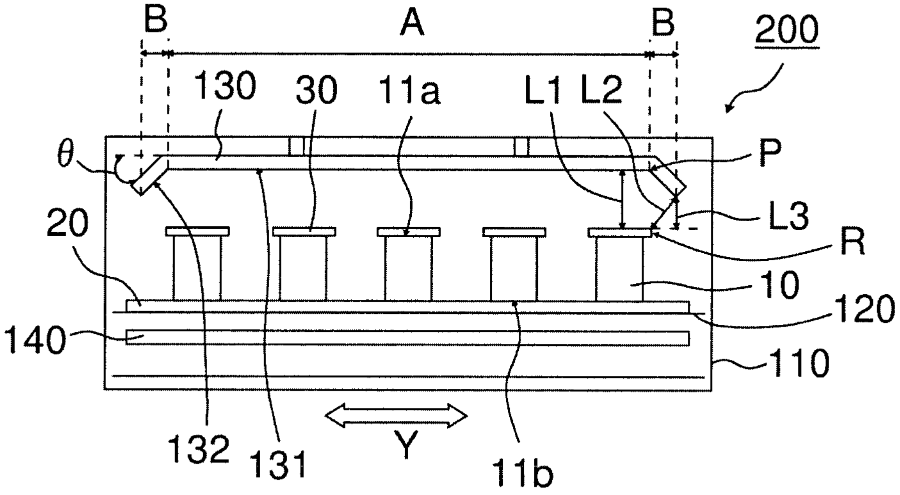
FIG. 5 is a schematic view of a dielectric drying device in an arrangement direction Y when auxiliary electrodes are placed on upper end faces of a plurality of ceramic formed bodies.

Here, FIG. 5 shows a schematic view of a dielectric drying device in the arrangement direction Y when the auxiliary electrodes 30 are placed on the upper end surfaces 11*a* of the plurality of ceramic formed bodies 10. A dielectric drying device 200 as shown in FIG. 5 is the same as the dielectric drying device 100 as shown in FIG. 2, with the exception that the former places the auxiliary electrodes 30 on the upper end surfaces 11*a* of the plurality of ceramic formed bodies 10.

A material of each auxiliary electrode 30 is not particularly limited. It is preferable that the material has a conductivity higher than that of the ceramic formed body 10. If it has such a conductivity, a function as the auxiliary electrode 30 can be sufficiently ensured. Examples of the material of the auxiliary electrode 30 include aluminum, copper, aluminum alloys, copper alloys, graphite and the like. These can be used alone or in combination of two or more.

As the auxiliary electrode 30, for example, a perforated plate can be used.

As used herein, the "perforated plate" means a plate material having openings.

A perforation ratio of the perforated plate is preferably from 20 to 90%, and more preferably from 40 to 80%, although not particularly limited thereto. The controlling of the perforation ratio within such a range can result in a uniform electric field strength of the ceramic formed body 10 on the upper end surface 11*a*, which would otherwise tend to generate a non-uniform electric field strength during dielectric drying. This can bring about a uniform heating amount of the ceramic formed bodies 10 as a whole to reduce uneven drying.

As used herein, the "perforation ratio of the perforated plate" means a ratio of perforated areas to the total area of the surface of the perforated plate, which is in contact with the upper end surface 11*a* of the ceramic formed body 10.

The openings on the surface of the perforated plate in contact with the upper end surface 11*a* of the ceramic formed body 10 may have various shapes, including, but not limited to, a circular shape, a quadrangular shape, and a slit shape.

When the auxiliary electrodes 30 are placed on the upper end surfaces 11*a* of the plurality of ceramic formed bodies 10, L1 is the shortest distance between the central region A and the auxiliary electrode 30, and L2 is the shortest distance between each end portion of the two end regions B and the auxiliary electrode 30.

By controlling the ratio L2/L1 to the above range, density distributions of the lines of electric force of the two ceramic formed bodies 10 at both ends in the arrangement direction Y will be substantially the same as those of the lines of electric force of the three ceramic formed bodies 10 at the center in the arrangement direction Y. Therefore, electric field strengths of the two ceramic formed bodies 10 at both ends in the arrangement direction Y are substantially the same as those of the three ceramic formed bodies 10 at the center in the arrangement direction Y, so that variations in the dried states of the plurality of ceramic formed bodies 10 in the arrangement direction Y can be suppressed.

Further, when the auxiliary electrodes 30 are placed on the upper end surfaces 11*a* of the plurality of ceramic formed bodies 10, preferably, in the upper electrode 130, an inclination starting point P of each of the two end regions B is located at the same position as an outer end Q of each of the ceramic formed bodies 10 at both ends in the arrangement direction Y, or is located outside the outer end Q.

The controlling of the position of the starting point P as described above leads to easy control of the density distribution of the lines of electric force in the region where the two ceramic formed bodies 10 at both ends in the arrangement direction Y are located to the same degree of density distribution of the lines of electric force in the region where the three central ceramic formed bodies 10 at the center in the arrangement direction Y are located. Therefore, the effect of suppressing the variations in the dried states of the plurality of ceramic formed bodies 10 in the arrangement direction Y can be stably obtained.

In the upper electrode 30, an inclination angle θ of each of the two end regions B with respect to the flat portion of the central region A is preferably from 30 to 90°, and more preferably from 45 to 90°.

The controlling of the inclination angle θ as described above leads to easy control of the density distribution of the lines of electric force in the region where the two ceramic formed bodies 10 at both ends in the arrangement direction Y are located to the same degree of density distribution of the lines of electric force in the region where the three central ceramic formed bodies 10 at the center in the arrangement direction Y are located. Therefore, the effect of suppressing the variations in the dried states of the plurality of ceramic formed bodies 10 in the arrangement direction Y can be stably obtained.

In a vertical direction Z, a shortest distance L3 between each end portion of the two end regions B and the ceramic formed body 10 or the auxiliary electrode 30 when the auxiliary electrodes 30 are placed is preferably from −50 to 50 mm, and more preferably from −30 to 30 mm.

The controlling of L3 as described above leads to easy control of the density distribution of the lines of electric force in the region where the two ceramic formed bodies 10 at both ends in the arrangement direction Y are located to the same degree of density distribution of the lines of electric force in the region where the three central ceramic formed bodies 10 at the center in the arrangement direction Y are located. Therefore, the effect of suppressing the variations in the dried states of the plurality of ceramic formed bodies 10 in the arrangement direction Y can be stably obtained.

The drying table 20 on which the ceramic formed bodies 10 are placed is not particularly limited. It is preferable to have the perforated plates at portions in contact with lower end surfaces 11*b* of the plurality of ceramic formed bodies 10. Such a configuration can allow water vapor to be easily removed from the lower end surfaces 11*b* of the ceramic formed bodies 10 during dielectric drying, so that the ceramic formed bodies 10 can be easily and uniformly dried.

Non-limiting examples of a material of the perforated plate include aluminum, copper, aluminum alloy, copper alloy, and graphite. These can be used alone or in combination of two or more.

The perforation ratio and the shape of the openings of the perforated plate used in the drying table 20 are not particularly limited. They may be the same as those of the perforated plate used in the auxiliary electrode 30.

Various conditions (frequency, output, heating time, and the like) during dielectric drying may be appropriately set depending on objects to be dried (ceramic formed bodies 10), types of the dielectric drying devices 100, 200, and the like. For example, the frequency during dielectric drying is preferably from 10 MHz to 100 MHz.

The ceramic formed bodies 10 to be subjected to dielectric drying preferably have a water content of from 1 to 60%, and more preferably from 5 to 55%, and even more preferably from 10 to 50%, although not limited thereto. The ceramic formed bodies 10 in such a range tend to vary in the dried states during dielectric drying. Therefore, the effect of the present invention can be more easily obtained by using the ceramic formed bodies 10 having the water content in such a range.

As used herein, the water content of the ceramic formed bodies 10 means a water content measured by an infrared heating type moisture meter.

The ceramic molded body 10 is preferably a honeycomb formed body including partition walls that define a plurality of cells extending from a first end face to a second end face, although not particularly limited thereto.

A cell shape of the honeycomb formed body (cell shape in a cross section orthogonal to a cell extending direction) is not particularly limited. Examples of the cell shape include a triangle, a quadrangle, a hexagon, an octagon, a circle or a combination thereof.

Examples of a shape of the honeycomb formed body include, but not limited to, a cylindrical shape, an elliptical pillar shape, and a polygonal pillar shape having a square, rectangular, triangular, pentagonal, hexagonal, and octagonal end faces.

The ceramic formed body 10 can be obtained by molding a green body obtained by kneading a raw material composition containing a ceramic raw material and water.

The ceramic raw material that can be used includes, but not particularly limited to, cordierite-forming raw materials, cordierite, silicon carbide, silicon-silicon carbide composite materials, mullite, aluminum titanate, and the like. These can be used alone or in combination of two or more. The cordierite-forming raw material is a ceramic raw material formulated so as to have a chemical composition in which silica is in the range of from 42 to 56% by mass, alumina is in the range of from 30 to 45% by mass, and magnesia is in the range of from 12 to 16% by mass. The cordierite-forming raw material is calcined to form cordierite.

The raw material composition may contain a dispersion medium, a binding material (for example, an organic binder, an inorganic binder, or the like), a pore former, a surfactant, and the like, in addition to the ceramic raw material and water. A composition ratio of each raw material preferably depends on the structures, materials, and the like of the ceramic formed bodies 10 to be produced, but not particularly limited.

A method of kneading the raw material composition to form the green body can use, for example, a kneader, a vacuum green body kneader, or the like. Further, a method of forming the ceramic formed body 10 can employ, for example, a known molding method such as extrusion molding and injection molding. Specifically, when the honeycomb formed body is produced as the ceramic formed body 10, the extrusion molding may be performed using a die having a desired cell shape, partition wall (cell wall) thickness, and cell density. Examples of a material of the die that can be used include hard metal alloys that are difficult to wear.

In the dielectric drying method and the dielectric drying devices 100, 200 for the ceramic formed bodies 10 according to the embodiment of the present invention, the shape of the upper electrode 130 is controlled such that the ratio L2/L1 is within a predetermined range, so that the density distributions (that is, the electric field strengths) of the electric lines of force at both ends and at the center in the arrangement direction Y can be of the same degree. Therefore, it is possible to suppress variations in the dried states of the plurality of ceramic formed bodies 10 in the arrangement direction Y.

(2) Method for Producing Ceramic Structures

The method for producing ceramic structures according to the embodiment of the present invention includes the above dielectric drying method for the ceramic formed bodies 10.

In the method for producing the ceramic structures according to the embodiment of the present invention, steps other than the above dielectric drying method are not particularly limited, and steps known in the art can be applied. Specifically, the method for producing the ceramic structures according to the embodiment of the present invention can further include a firing step of drying the ceramic formed bodies 10 using the above dielectric drying method to obtain ceramic dried bodies, and firing the ceramic dried bodies to obtain ceramic structures.

A method for firing the ceramic dried bodies is not particularly limited, and for example, the ceramic dried bodies may be fired in a firing furnace. Further, for the firing furnace and firing conditions, known conditions can be appropriately selected depending on the outer shapes, materials, and the like of the honeycomb structures to be produced. Prior to firing, organic substances such as a binder may be removed by calcination.

Since the method for producing the ceramic structures according to the embodiment of the present invention includes the dielectric drying method capable of suppressing variations in the dried states of the plurality of ceramic formed bodies 10 in the arrangement direction Y, the ceramic structures having a uniform shape can be produced.

Examples

Hereinafter, the present invention will be described in more detail with reference to Examples, but the present invention is not limited to these Examples.

(Production of Ceramic Formed Bodies)

Honeycomb formed bodies were produced as ceramic formed bodies. First, A cordierite-forming raw material obtained by mixing alumina, kaolin and talc as a ceramic raw material was mixed with a binding material containing an organic binder, a water-absorbent resin as a pore former, and water (42% by mass) as a dispersion medium to form a raw material composition, which was kneaded to provide green bodies. Each of the resulting green bodies was extruded to obtain a honeycomb formed body including cells each having a square cross-sectional shape orthogonal to the extending direction of the cells. The honeycomb formed body had an outer diameter (diameter) of 144 mm, a length (length in the extending direction of the cells) of 260 mm, and an outer shape that was a cylindrical shape. Further, the honeycomb formed bodies had a water content of 42% and a weight of 1320 g. The water content and weight of the honeycomb formed bodies are average values of all the produced honeycomb formed bodies.

(Dielectric drying of Ceramic Formed Bodies)

Dielectric drying was carried out using the ceramic formed bodies produced above. Specifically, the following procedure was used:

Five ceramic formed bodies were placed side by side in the arrangement direction Y on the upper surface of the drying table, and auxiliary electrodes having the same thickness were placed on the upper end surfaces of the five ceramic molded bodies (see FIG. 5). Thus, nine drying tables in total, each on which the five ceramic formed bodies were placed, were prepared.

The dielectric drying device used upper electrodes having various shapes (an inclination angle θ was from 0 to) 90°, and the distances (L1 to L3) between each upper electrode and each of the ceramic formed bodies was set to a predetermined value. These conditions are shown in Table 1.

The dielectric drying was carried out by placing nine drying tables, each on which five honeycomb formed bodies were placed, on the conveying unit (conveyor) for the dielectric drying device, and then conveying the drying tables into the dielectric drying furnace, and drying them under conditions of a frequency of 40.68 MHz (ISM band), an output of 85.0 kW, and a heating time of 12 minutes.

(Calculation of Heating Amount Difference)

First, each of the ceramic formed bodies placed side by side in the arrangement direction Y was analyzed by a simulation using the differential time domain method (FDTD method). In the simulation, the electric field strength E at each lattice point in the ceramic formed body was determined.

The heating amount H at each lattice point was then calculated from the obtained electric field strength E from the following equation (1):

[Equation 1]

$$H = \frac{1}{2}\omega\varepsilon\tan\delta|E|^2 \tag{1}$$

In the equation (1), ω is an angular frequency (2π×40 MHz), ε is a dielectric constant of the ceramic formed body, and tan δ is a dielectric loss tangent of the ceramic formed body.

The heating amounts H at the lattice points in the respective ceramic formed bodies were then totaled to calculate the total heating amount of the respective ceramic formed bodies.

With regard to the heating amount difference, the total heating amount of the five ceramic formed bodies placed side by side in the arrangement direction Y was defined as H1 to H5 (in FIG. 5, the total heating amounts of the ceramic formed bodies from the left end to the right end were sequentially defined as H1 to H5), and the heating amount difference was calculated by the following equation (2):

[Equation 2]

$$\text{Heating Amount Difference} = \left(\frac{H3}{H1+H2+H3+H4+H5} - \frac{H1}{H1+H2+H3+H4+H5}\right)\times 100 \quad (2)$$

Figure 6:
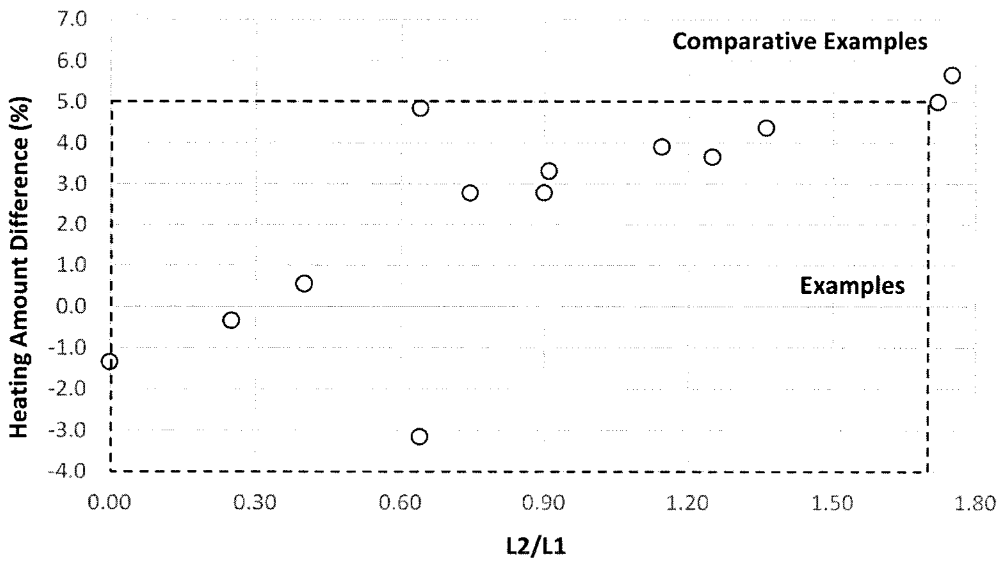
FIG. 6 is a graph showing a relationship between a ratio L2/L1 and a heating amount difference in Examples.

The results of the heating amount difference are shown in Table 1. Further, FIG. 6 shows a graph showing a relationship between the ratio L2/L1 and the heating amount difference. In FIG. 6, the inside of the dotted line frame is the scope of the present invention.

TABLE 1

| Sample No. | L1 (mm) | L2 (mm) | L3 (mm) | L2/L1 | Inclination Angle θ (*) | Heating Amount Difference (%) | Classification |
|---|---|---|---|---|---|---|---|
| A | 100 | 0 | 0 | 0.00 | 90 | −1.3 | Example |
| B | 100 | 25 | 0 | 0.25 | 90 | −0.3 | Example |
| C | 100 | 40 | 0 | 0.40 | 90 | 0.6 | Example |
| D | 100 | 90 | 0 | 0.90 | 90 | 2.8 | Example |
| E | 100 | 125 | 0 | 1.25 | 90 | 3.7 | Example |
| F | 100 | 175 | 0 | 1.75 | 90 | 5.7 | Comp. |
| G | 100 | 172 | 0 | 1.72 | 0 | 5.0 | Comp. |
| H | 100 | 136 | 0 | 1.36 | 30 | 4.4 | Example |
| I | 100 | 115 | 0 | 1.15 | 45 | 3.9 | Example |
| J | 100 | 91 | 0 | 0.91 | 60 | 3.3 | Example |
| K | 100 | 74 | 0 | 0.74 | 70 | 2.8 | Example |
| L | 100 | 64 | 50 | 0.64 | 90 | 4.8 | Example |
| M | 100 | 64 | −50 | 0.64 | 90 | −3.2 | Example |

As shown in Table 1 and FIG. 6, it was found that in Examples of the present invention where the ratio L2/L1 was in the range of from 0 to 1.70, the heating amount difference was less than 5.0%, so that variations in the dried states of the ceramic formed bodies in the arrangement direction Y could be suppressed.

On the other hand, it was found that in Comparative Examples where the ratio L2/L1 was out of the range of from 0 to 1.70, the heating amount difference was 5.0% or more, so that there were larger variations in the dried states of the ceramic formed bodies in the arrangement direction Y.

As can be seen from the above results, according to the present invention, it is possible to provide a dielectric drying method and a dielectric drying device for ceramic formed bodies, which can suppress variations in the dried states of a plurality of ceramic formed bodies placed on the drying table, in the arrangement direction Y perpendicular to the conveying direction X. Further, according to the present invention, it is possible to provide a method for producing ceramic structures capable of making the ceramic structures having a uniform shape.

DESCRIPTION OF REFERENCE NUMERALS

10 ceramic formed body
11*a* upper surface
11*b* lower surface
20 drying table
30 auxiliary electrode
100, 200 dielectric drying device
110 dielectric drying furnace
120 conveying unit
130 upper electrode
131 flat surface portion
132 inclined portion
140 lower electrode

The invention claimed is:

1. A dielectric drying method for ceramic formed bodies, the method comprising drying a plurality of ceramic formed bodies placed side by side in an arrangement direction Y perpendicular to a conveying direction X on an upper surface of a drying table by conveying the ceramic formed bodies between electrodes of an upper electrode and a lower electrode, and applying a high frequency between the electrodes, wherein the upper electrode comprises: a central region; and two end regions between which the central region is located, in the arrangement direction Y;

wherein the central region has a flat surface portion parallel to an upper end surface of the ceramic formed body, wherein each of the two end regions has an inclined portion inclined toward the lower electrode side; and wherein a ratio L2/L1 is from 0 to 1.70, in which L1 is a shortest distance between the central region and the ceramic formed body, and L2 is a shortest distance between each end of the two end regions and the ceramic formed body.

2. The dielectric drying method for ceramic formed bodies according to claim 1, wherein an inclination starting point of each of the two end regions is located at the same position as an outer end of each of the ceramic formed bodies at both ends, or is located outside the outer end, in the arrangement direction Y.

3. The dielectric drying method for ceramic formed bodies according to claim 1, wherein auxiliary electrodes are placed on upper end surfaces of the ceramic formed bodies, and wherein the L1 is the shortest distance between the central region and the auxiliary electrode, and the L2 is the shortest distance between each end of the two end regions and the auxiliary electrode.

4. The dielectric drying method for ceramic formed bodies according to claim 3, wherein the inclination starting point of each of the two end regions is located at the same position as an outer end of each of the auxiliary electrodes at both ends, or is located outside the outer end, in the arrangement direction Y.

5. The dielectric drying method for ceramic formed bodies according to claim 1, wherein the ratio L2/L1 is from 0 to 0.70.

6. The dielectric drying method for ceramic formed bodies according to claim 1, wherein an inclination angle of each of the two end regions with respect to a flat portion of the central region is from 30 to 90°.

7. The dielectric drying method for ceramic formed bodies according to claim 1, wherein, in a vertical direction Z, a shortest distance L3 between each end of the two end regions and the ceramic formed body or the auxiliary electrode when the auxiliary electrodes are placed is from −50 to 50 mm.

8. The dielectric drying method for ceramic formed bodies according to claim 1, wherein each of the ceramic formed bodies has a water content of from 1 to 60%.

9. The dielectric drying method for ceramic formed bodies according to claim 1, wherein the ceramic formed bodies are honeycomb formed bodies, each of the honeycomb formed bodies comprising partition walls that define a plurality of cells each extending from a first end face to a second end face.

10. A method for producing ceramic structures, comprising the dielectric drying method for the ceramic formed bodies according to claim 1.

11. A dielectric drying device for ceramic formed bodies, the device comprising:

an upper electrode;

a lower electrode; and a conveying unit capable of conveying a plurality of ceramic formed bodies between electrodes of the upper electrode and the lower electrode, the ceramic formed bodies being placed side by side in an arrangement direction Y perpendicular to a conveying direction X on an upper surface of a drying table, wherein the upper electrode comprises: a central region; and two end regions between which the central region is located, in the arrangement direction Y;

wherein the central region has a flat surface portion parallel to an upper end surface of the ceramic formed body, wherein each of the two end regions has an inclined portion inclined toward the lower electrode side; and wherein a ratio L2/L1 is from 0 to 1.70, in which L1 is a shortest distance between the central region and the ceramic formed body, and L2 is a shortest distance between each end of the two end regions and the ceramic formed body.

12. The dielectric drying device according to claim 11, wherein an inclination starting point of each of the two end regions is located at the same position as an outer end of each of the ceramic formed bodies at both ends, or is located outside the outer end, in the arrangement direction Y.

13. The dielectric drying device according to claim 11, wherein auxiliary electrodes are placed on upper end surfaces of the ceramic formed bodies, and wherein the L1 is the shortest distance between the central region and the auxiliary electrode, and the L2 is the shortest distance between each end of the two end regions and the auxiliary electrode.

14. The dielectric drying device according to claim 13, wherein the inclination starting point of each of the two end regions is located at the same position as an outer end of each of the auxiliary electrodes at both ends, or is located outside the outer end, in the arrangement direction Y.

15. The dielectric drying device according to claim 11, wherein the ratio L2/L1 is from 0 to 0.70.

16. The dielectric drying device according to claim 11, wherein an inclination angle of each of the two end regions with respect to a flat portion of the central region is from 30 to 90°.

17. The dielectric drying device according to claim 11, wherein, in a vertical direction Z, a shortest distance L3 between each end of the two end regions and the ceramic formed body or the auxiliary electrode when the auxiliary electrodes are placed is from −50 to 50 mm.

* * * * *